Nov. 17, 1964  F. J. NESSLINGER ETAL  3,157,248
MOBILE EXTENDABLE SCAFFOLD
Filed Nov. 16, 1962  8 Sheets-Sheet 2

INVENTORS
FRITZ J. NESSLINGER
ARTHUR C. BORGMAN
BY
ATTORNEYS

Nov. 17, 1964 F. J. NESSLINGER ETAL 3,157,248
MOBILE EXTENDABLE SCAFFOLD
Filed Nov. 16, 1962 8 Sheets-Sheet 6

INVENTORS
FRITZ J. NESSLINGER
ARTHUR C. BORGMAN
BY
Curtis, Morris and Safford
ATTORNEYS Nov. 17, 1964   F. J. NESSLINGER ETAL   3,157,248
MOBILE EXTENDABLE SCAFFOLD
Filed Nov. 16, 1962                    8 Sheets-Sheet 7

INVENTORS
FRITZ J. NESSLINGER
ARTHUR C. BORGMAN
BY
ATTORNEYS

INVENTORS
FRITZ J. NESSLINGER
ARTHUR C. BORGMAN
BY

ATTORNEYS

3,157,248
MOBILE EXTENDABLE SCAFFOLD
Fritz J. Nesslinger, College Point, and Arthur C. Borgman, Franklin Square, N.Y., assignors to The Patent Scaffolding Co., Inc., Long Island City, N.Y.
Filed Nov. 16, 1962, Ser. No. 238,216
27 Claims. (Cl. 182—152)

The present invention relates to mobile extendable scaffolds.

Known types of apparatus for similar purposes have been inadequate because of inherent structural limitations or disadvantages in use. In some cases, apparatus designed for stability is unwieldy and excessively heavy. Other types are unduly limited in their range of usefulness. Thus, some mobile scaffold devices are unsuited to the support of work platforms and of the operators using them except at relatively low levels or at levels only a few feet above the supporting floor. And where added height is attainable, as by extensions or the like, in the use of some known devices, they involve relatively complex assemblies which are costly to build, which in some instances require expensive power devices to operate, or which can be raised and lowered manually only by more than one operator.

An object of the present invention has been to provide a mobile manually extendable and retractable scaffold structure whereof major parts can advantageously be made of aluminum or aluminum alloys to produce a relatively light weight apparatus without sacrificing strength or durability.

A further object has been to provide relatively light weight scaffold equipment which combines a mobile ladder carrier or base and an extendable ladder and work platform manually movable in relation to said carrier to and from relatively high level working positions nd having effective lateral stability thereby ensuring a wider scope of usefulness and greater safety of the equipment in use as compared to known devices.

A further object has been to provide scaffold equipment embodying in some respects improvements over devices described and claimed in our application Ser. No. 108,232, filed Mar. 9, 1961 and now Patent No. 3,105,572 and in the application of Arthur C. Borgman, Ser. No. 151,622, filed Nov. 13, 1961 and now Patent No. 3,105,710.

A further object has been to provide scaffold equipment of light weight and wide range of use which can be folded to optimum compactness for mobility and which can readily be extended manually into position and condition for use.

A further object has been to provide mobile scaffold equipment wherein a relatively lightweight base or carrier including end frames connected by foldable or collapsible side braces can readily be folded to collapsed condition and unfolded to extended operative condition and wherein an assembly of a main ladder and an extendable ladder engaged therewith and provided with a work platform at its upper end can readily be mounted on and dismounted from operative position on the extended base and can be actuated to raise and lower said extendable ladder and said platform in relation to said base.

A further object has been to provide a foldable extendable base or carrier assembly provided with outrigger or lateral braces which releasably interlock with side braces of the carrier in both the folded and extended conditions thereof.

A further object has been to provide effective lateral braces for the extendable ladder and work platform including locking devices effective at all operative extended positions thereof to releasably lock said ladder and its braces in said positions.

A further object has been to provide manually operative devices for effectively raising and controlling the lowering of the extendable ladder and its lateral braces and to provide suitable attaching and locking devices which operate substantially simultaneously to retain the ladder and lock the braces in extended condition and which are also operated simultaneously to release and thereby permit return of the raised ladder and brace parts to lowered or retracted condition.

A mobile scaffold according to the present invention includes in general a unitary mobile base or carrier assembly of collapsible or foldable type wherein frame members which may conveniently be designated as front and rear end frames, respectively, are connected by transversely spaced sets of extendable pivotally interconnected side braces; and the carrier is laterally stabilized in use, i.e. with said side braces in extended condition, by transversely disposed outrigger braces arranged with their outer end portions extending laterally and downwardly and outwardly beyond said side braces. The assembly of said carrier frames and bracing means therefor is such that, with the carrier in folded or collapsed condition, as when not in use, the outrigger braces are nested in upright position substantially parallel with and between opposed portions of the telescoped and folded side braces; and portions of said side braces are nested between opposed upright portions of said end frames. Suitable locking means are provided to releasably retain said carrier parts both in folded and in extended condition. A work platform is removably mounted at the upper end of the extendable ladder of a ladder assembly of which the lower or main ladder is releasably engageable with and supported on what may be designated as the front end frame of said carrier; and ladder braces each comprising a set of cooperating telescoping upper and lower brace tubes are adjustably interposed between upper end portions of said extendable ladder and lower portions of the rear end frame, the arrangement being such that the upper brace tubes are pivotally connected to said extendable ladder and are adjustable longitudinally in relation to said lower brace tubes, and the lower brace tubes are releasably supported on and secured to said rear end frame when the apparatus is assembled for use. Means for actuating the extendable ladder and said upper brace tubes includes a harness having end portions releasably secured to parts of locking devices exposed at lower end portions of the lower brace tubes; and other or intermediate portions of said harness are engaged with pulleys on said main ladder and on said extendable ladder, respectively, of said ladder assembly whereby said extendable ladder and said upper brace tubes are movable simultaneously to and from operative condition. A hand hold secured at an accessible end portion of the harness provides means for manually actuating the harness to raise and lower the extendable ladder, to release the interlock between said upper and lower brace tubes, and to extend and control retraction of the upper ladder brace tubes.

Other objects and important structural and operating features and advantages of our invention not above referred to will appear from disclosures in the specification and claims herein and in the accompanying drawings which illustrate a preferred embodiment of said invention as described in said specification. It is noted that said disclosures are not to be construed either to be exhaustive or as limiting the scope of the invention but are presented for the purpose of so clearly disclosing the invention that others skilled in the art may fully understand it as well as its principles of operation and its application in use and so that they may embody it and adapt it in various forms appropriate to various requirements in use.

Referring to the drawings:

FIG. 5, are releasably retained in folded condition;

Figures 1, 3, 16:
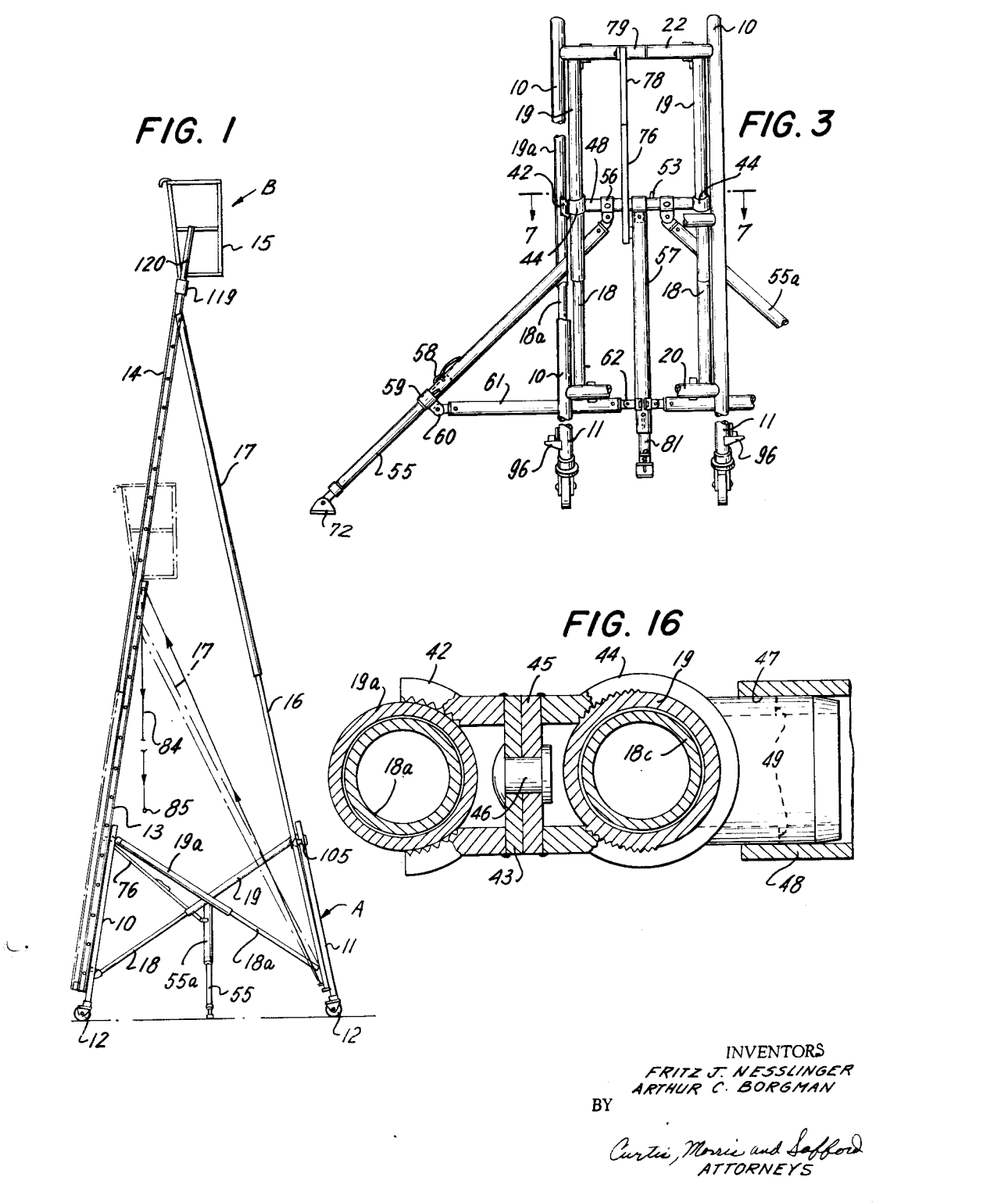
FIGURE 1 is a side elevation showing a mobile carrier in extended or operative condition, an extension ladder assembly mounted thereon and a work platform operatively mounted at the upper end of the extendable ladder of said assembly in condition for use, with the ladder braces and the outrigger carrier braces in operative extended position; said platform and said upper ladder being shown in retracted or down position in dotted lines and in extended or up position in full lines.
FIG. 3, a front end elevation, as viewed from the right of FIGURE 2, with the ladder removed, showing the front end frame of the carrier, and with parts broken away to show portions of the carrier braces and the outrigger brace assembly.
FIG. 16, an enlarged fragmentary view in horizontal transverse section on the line 16—16 of FIG. 5, showing the pivotal connection between the crossed upper brace tube members of the assemblies of telescoping upper and lower brace tubes which provide side braces interposed between the end frames of the ladder carrier.

Referring to FIGURE 1, an embodiment of an extendable scaffold according to the invention comprises a mobile and collapsible or foldable base or carrier A including end frames which may conveniently be identified as a front end frame 10 and a rear end frame 11 supported on suitable wheels or casters 12 which can be locked or braked to immobilize the carrier, said end frames being connected by braces to be described.

A main ladder 13 may be releasably mounted on said carrier, as on front end frame 10. An extendable ladder 14 slidably mounted on main ladder 13 is provided with means for removably supporting at its upper end a suitable work platform B including a cage or frame 15. The ladder 14 when in operative position on carrier A is braced laterally at each side by a longitudinally adjustable ladder brace including a lower tube 16 supported at its lower end on and releasably secured to rear end frame 11. The upper end of tube 16 telescopes into an upper tube 17 having its upper end pivotally connected to an upper end portion of extendable ladder 14, in a manner to be described.

Figure 2:
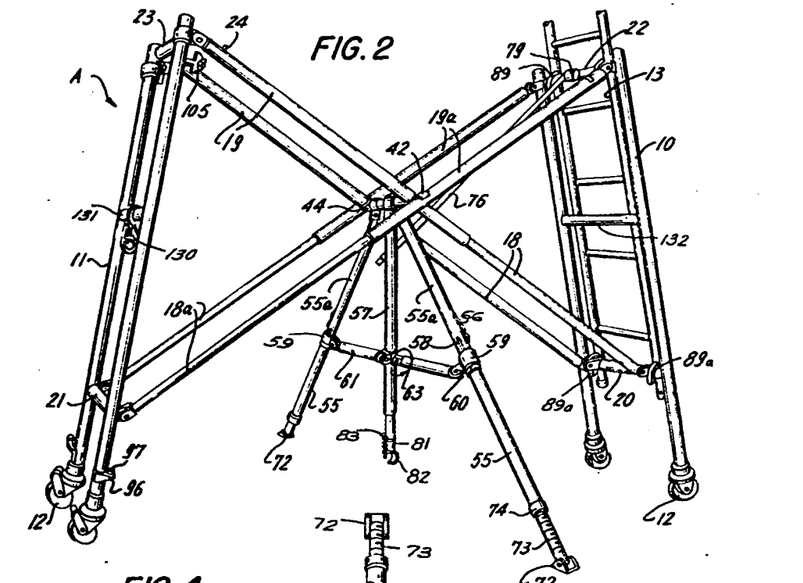
FIG. 2, a three quarter side view in perspective of the mobile carrier with the parts positioned as in extended condition for use and with a lower or main ladder mounted on the front end frame (right) of the carrier.
Figure 4:
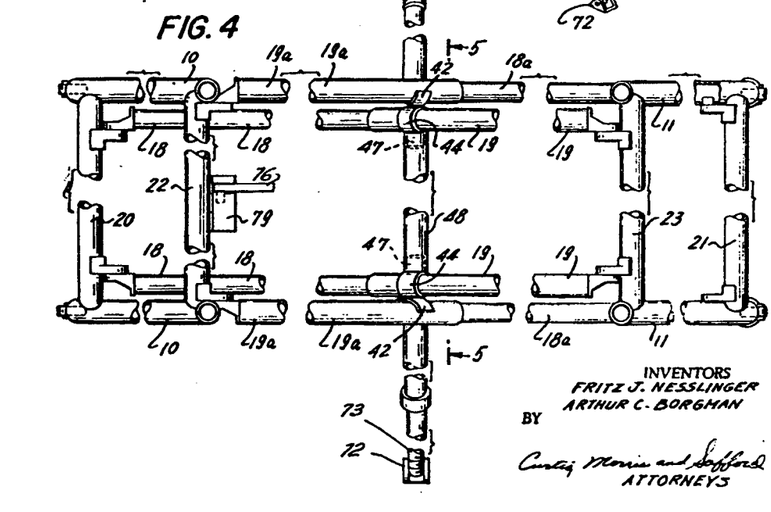
FIG. 4, a top plan view of the carrier shown in FIG. 2 with parts broken away or interrupted, the front end frame in this view being indicated at the left instead of at the right as in FIG. 2.

As seen in FIGURE 2, the front end frame 10 and rear end frame 11 of carrier A are connected by two laterally spaced sets of telescoping and folding side braces. Each of said sets includes lower tubes 18 and 18(a) which telescope into upper tubes 19 and 19(a), respectively. The lower ends of lower tubes 18 are pivotally connected to lower end portions of front end frame 10, as to the lowermost cross piece 20 thereof. The lower ends of lower tubes 18(a) are similarly connected to a lower cross piece 21 of rear end frame 11.

Figures 18, 19, 20, 21, 22:
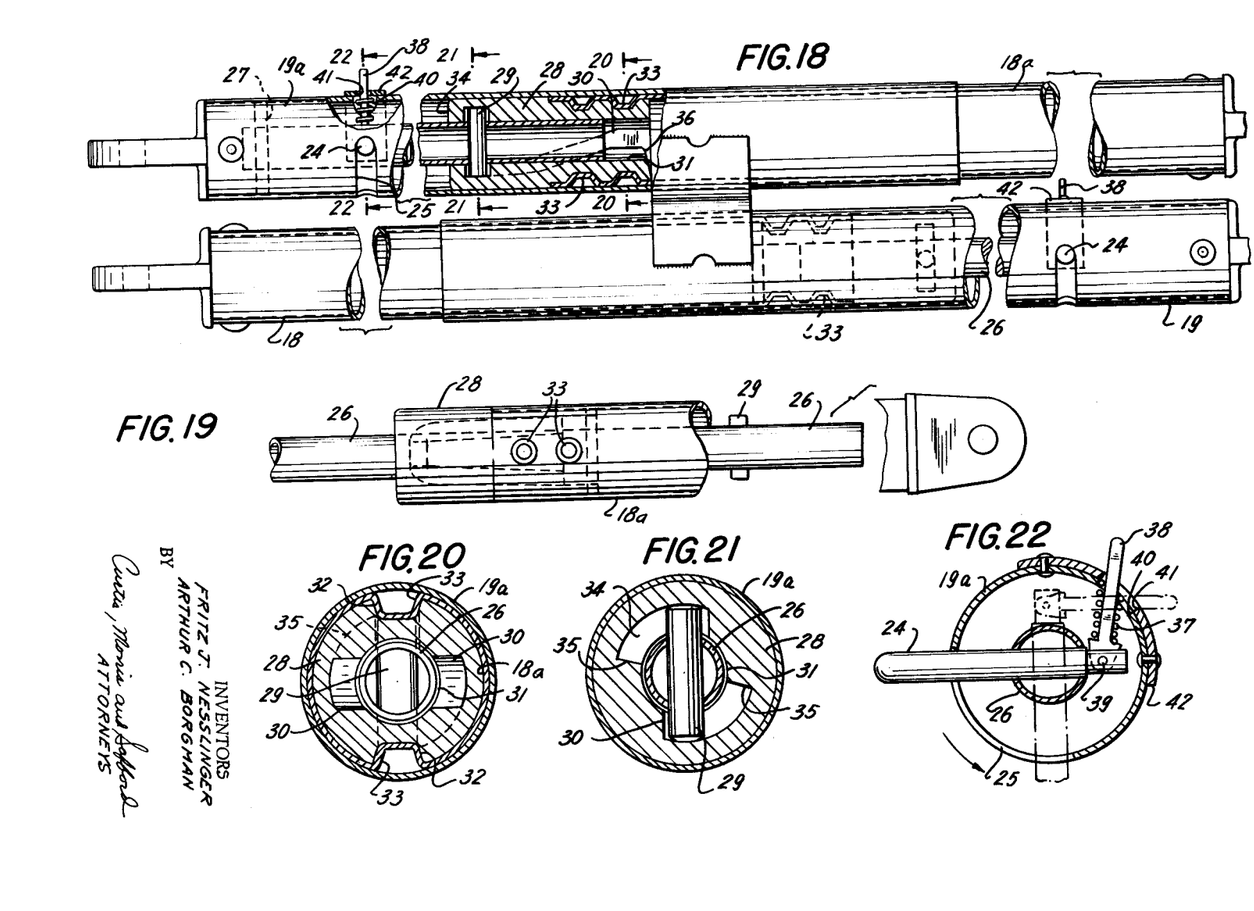
FIG. 18, a detail view with parts broken away illustrating portions of the cooperating telescoping upper and lower tubes of each set of side braces of the carrier, said parts being shown in condition to retain the latter in extended or operative condition, and menas for interlocking said telescoping parts in said condition and for releasing said interlocking means to permit folding of the carrier parts to inoperative condition.
FIG. 19, a fragmentary view with parts broken away of the upper end portion of one of the lower or smaller diameter tubes of the carrier braces shown in FIG. 18 with the locking pin disengaged from the locking sleeve.
FIG. 20, a cross section on the line 20—20 of FIG. 18.
FIG. 21, a cross section on the line 21—21 of FIG. 18.
FIG. 22, a cross section on the line 22—22 of FIG. 18.

The upper ends of upper tubes 19a and 19 are pivotally connected to the uppermost cross pieces 22 and 23 of front end frame 10 and rear end frame 11, respectively. With the carrier parts interconnected and conditioned as shown in FIG. 2, each lower tube is releasably interlocked with its corresponding upper tube. Suitable locking means for this purpose, shown more particularly in FIGS. 18 through 22 include for each brace a manually actuatable toggle lever or finger piece 24 angularly movable in a path defined by an arcuate slot 25 in an upper end portion of each of the upper tubes as 19a of such brace. The inner end of lever 24 is connected to actuate a hollow locking rod 26 located coaxially in tube 19a and mounted in suitable bearings to rotate through a 90° arc when the outer end of lever 24 is moved from one end to the other of slot 25. Lever 24, cooperating with slot 25 also serves to retain said rod 26 against endwise movement while permitting rotation thereof. Thus, a bearing for one end of rod 26 at the left, FIG. 18, is provided in a transverse wall 27 (shown dotted) located at the upper end of upper tube 19a; and the other bearing is provided by the axial bore 31, FIGS. 20 and 21, of a sleeve block or locking sleeve 28 secured in the upper end of the lower tube 18 and slidable endwise in tube 19a during relative endwise movements of said upper and lower tubes. As seen more clearly in FIG. 20, block 28 is formed with opposed outwardly opening recesses 32 into which outer end portions 33 of the lower tube 18 are crimped to secure said block 28 in operative position at the outer end of said tube 18.

Said rod 26 is provided near its lower end with a cross or locking pin 29 which, in locking position of said rod 26 and of lever 24 at one end of slot 25, is engaged with angularly offset recesses 35 at end portions of spirally arranged grooves 30 which open into axial bore 31 of said block 28. The outer ends (left FIG. 18) of grooves 30 in block 28 are closed by the end or stop wall 34 of said block and open into said offset recesses 35. Thus, with the lower end (right FIG. 18) of locking rod 26 operatively engaged with block 28, the ends of locking pin 29 are adapted to ride into and out of and along the opposed spiral grooves 30. Inner end portions (right FIG. 18) of block 28 at the open inner ends of slots 30 are slightly chamfered at 36 to facilitate entry of pin 29 into grooves 30 when the tubes 18 and 19a are approaching their extended position, as shown in FIG. 18. When relative extending movement of said tubes brings pin 29 against the end or stop wall 34 at the outer ends of spiral grooves 30, and said pin is rotated into said recesses 35, rod 26 is retained by spring pressure in position to hold the pin ends in said locking recesses, FIG. 18, thus releasably locking tubes 18 and 19a against reverse or telescoping movement toward retracted condition. This locking action or movement of pin ends 29 is initiated by the spiral grooves 30 which rotate rod 26 a part turn and in part by spring actuated devices associated with toggle lever 24 which in one end position releasably maintains said rod in locking condition.

Figure 5:
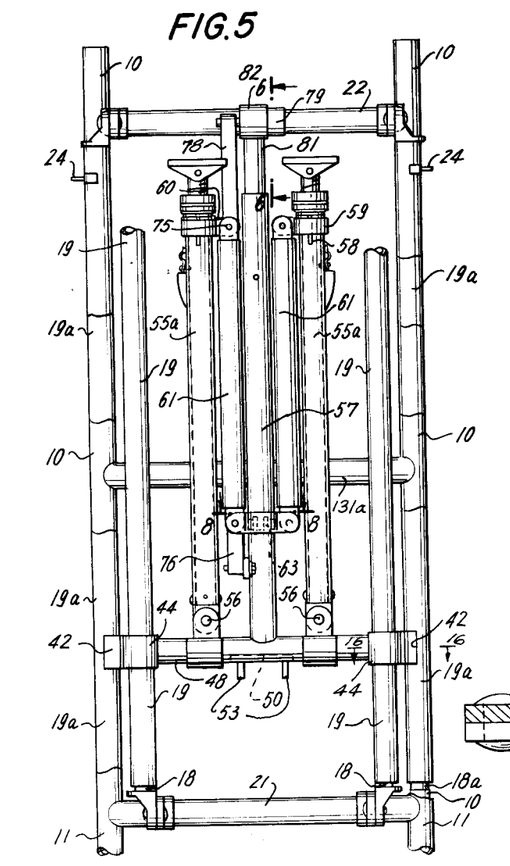
FIG. 5, a rear view in elevation with parts broken away or interrupted showing portions of the carrier in folded or inoperative condition and cooperating side braces in effect folded and nested between the end frames of the carrier, a transverse spacer tube mounted between and rotatable on opposed portions of said side braces and locking devices associated therewith, outrigger braces, pivot connections between said spacer and said outrigger braces, a post (shown in erect position) secured at its lower end to said spacer tube, and transverse outrigger tie pieces or stays providing releasable stabilizing connections between said post and portions of the respective outrigger braces.

As seen in FIGS. 18 and 22, said devices may include a compression spring 37 engaged with a guide arm 38 pivoted at 39 on the inner end of toggle lever 24. The outer end of guide arm 38 extends through an opening 40 in the wall of tube 19a and a slot 41 in a spring retaining plate 42. The outer end portion of spring 37 extends into opening 40 and bears against under surface portions of plate 42 which are exposed through opening 40 adjacent to slot 41. Thus, spring 37 biases toggle lever 24 and rod 26 in the locking position shown in full lines in FIG. 22 and also in the opposite position, FIG. 19. When lever 24 is deflected manually 90° in the direction of the arrow, FIG. 22, to the dotted line position there shown, guide arm 38 snaps to the dotted line or unlocking position wherein spring 37 biases toggle lever 24 and hollow rod 26 in a direction so that the ends of locking pin 29 may move angularly out of recesses 35 and come opposite the outer ends of spiral grooves 30. When the tubes 18 and 19a are now moved endwise into telescoping relation, pin 29 is caused to rotate sufficiently while traversing the spiral grooves 30 to bring rod 26 into position to disengage pin 29 from block 28, for example in the angular position, as seen in FIG. 19. Said pin remains in this disengaged angular position until its ends again enter grooves 30 in the next movement of tubes 18 and 19a into extended relation. When the parts just above described are in unlocked condition, tubes 18 and 18a may slide freely in said tubes 19 and 19a, respectively, between the extended positions shown in FIG. 2 and the telescoped positions as shown in FIG. 5. In a typical embodiment, the outer ends of toggle levers 24 will conveniently extend from the upper tubes in such position and at such height that they are readily accessible for manual actuation by an operator standing on the floor alongside the carrier.

Referring to FIGS. 2, 4, 5 and 16, the upper tubes, as 19, 19a of each of the two sets of side braces are pivotally connected in crossed relation so that the braces may be actuated, i.e. extended and retracted, readily along with movement of the end frames in adjusting the carrier parts between extended and folded conditions, as seen in FIGS. 2 and 5, respectively. For this purpose, a fitting 42, FIG. 16, is secured, as by welding, to a side portion of tube 19a for example and includes a bearing plate 43. Another fitting 44 secured, as by welding, to tube 19 includes a bearing plate 45 which abuts and is rotatably connected to bearing plate 43 by pivot 46. Thus, tubes 19 and 19a are rotatable in relation to each other to permit relative rotative movement of said tubes to and from their end positions of angular adjustment about the axis of pivot 46.

The fitting on brace tube 19 includes a collar providing in effect a bearing 47 which extends into one open end of a transversely arranged tubular spacer or cross tube 48. A corresponding bearing, FIG. 4, extends into the opposite end of tube 48 which is thus rotatably engaged with and supported between the opposed brace tubes 19. The inner or opposed edges of bearings 47 are provided with notches 49 angularly spaced 180° oppositely positioned which cooperate with devices carried by said cross tube 48, FIG. 7, to releasably lock tubes 19 thereto both in the folded and in the extended condition of carrier A as in FIGS. 5 and 2 or 3, respectively.

Figure 7:
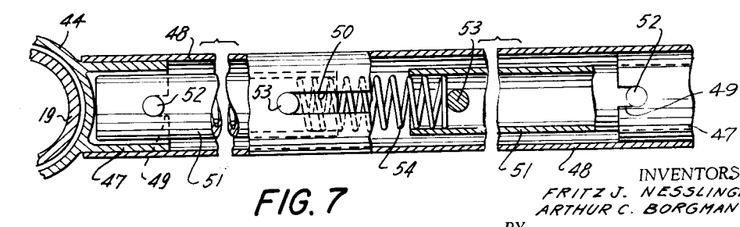
FIG. 7, a fragmentary view on enlarged scale with portions broken away and portions in transverse horizontal section taken from the line 7—7, FIGURE 3, showing details of locking means associated with the spacer tube whereby in one position, FIG. 3, the spacer tube, the outrigger and the side braces are releasably retained in extended condition; and in another position.

For this purpose, cross tube 48 has a longitudinal slot 50, FIG. 7, in an intermediate portion of its wall. Two hollow spring biased plungers 51 are slidably mounted coaxially in opposed relation in said cross tube 48. Each plunger carries at an outer end portion a transversely arranged locking pin 52 with its radially extending exposed ends positioned for releasable locking engagement with said notches 49 in bearing 47 to thereby prevent relative rotative movement between said opposed upper brace tubes and the cross tube 48 with its appended parts. Said plungers 51 are fitted with transverse pins 53 of which inner end portions serves as stops to engage the ends of an expansion spring 54 which is thus confined in compressed condition between opposed inner end portions of said plungers 51. The outer ends of pins 53, FIG. 5, extend outwardly or radially through slot 50 to prevent rotation of said plungers 51 in cross tube 48 and to provide finger holds which, when pressed one toward the other against resistance of spring 54, withdraw the ends of said locking pins 52 from locking engagement with notches 49. In this released condition of the locking means, cross tube 48 with the parts appended thereto may be rotated on said bearings 47 in relation to upper tubes 19 FIG. 4, to and from their end positions; and the crossed upper tubes 19 and 19a may be rotated one in relation to the other on pivot 46 for movement between their folded and extended or operative positions. Hence, the hereinafter described outrigger brace assembly carried by cross tube 48 is also releasably locked in operative or down position when the brace parts are disposed as in FIG. 2 and is releasably locked in inoperative or up position when the brace parts are folded as in FIG. 5. In the transition from operative to said inoperative condition, cross tube 48 is rotated 180°, thereby bringing the pins 53 from their erect position as seen in FIG. 3 to the depending position shown in FIG. 5.

FIGURES 2, 3 and 5 show more clearly the outrigger brace assembly carried on cross tube 48 and including adjustable outrigger braces each comprising a tube 55 of smaller diameter telescoping into the open end of a tube 55a of larger diameter, the opposite end thereof being pivoted on bracket 56 secured to cross tube 48, FIG. 3. A post 57 is secured to cross tube 48 midway between brackets 56, the longitudinal axes of said post 57 and said outrigger braces being disposed in substantially the same transverse plane.

Figure 8:
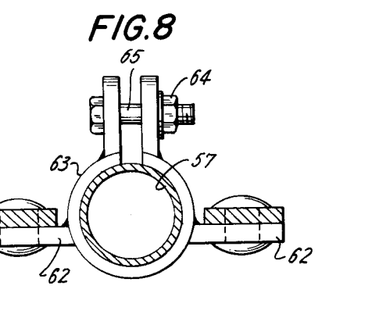
FIG. 8, a fragmentary view partly in transverse horizontal section on the line 8—8 of FIG. 5 of a clamp longitudinally slidable in released condition on said post for releasably securing the outriggers and other carrier parts in operative and in folded condition.

The lower end of each upper outrigger brace tube 55a, FIG. 2, is provided with longitudinal slots or cuts 58 spaced 90° apart. A clamp 59, FIG. 25, embraces tube 55a at said slotted end and provides a bracket 60 to which is pivoted the outer end of outrigger tying tube 61, FIGS. 2 and 3. The inner end of said tube 61 is pivoted to bracket 62 extending laterally from clamping collar 63, FIG. 8, which is mounted for sliding adjustment on post 57. Said collar may be tightened in any desired position along post 57 and thereafter loosened by adjusting the nut 64 on bolt 65. Thus, when said clamp is loosened and free to slide upwardly on post 57 from its position as seen in FIG. 2, the tying tubes 61 and brace tubes 55a may be swung in a direction toward post 57 into inoperative or folded relation.

Figures 25, 26, 27:
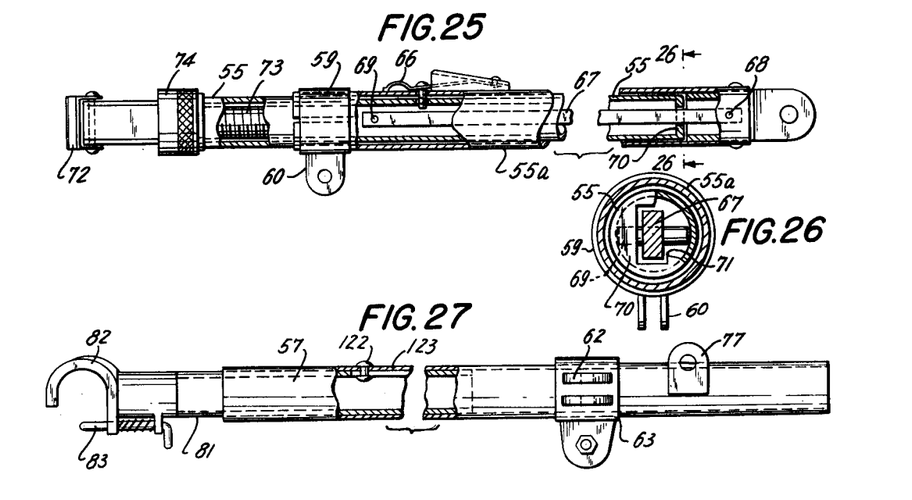
FIG. 25, a side view with parts broken away of an extendable outrigger brace.
FIG. 26, a cross section on the line 26—26 of FIG. 25.
FIG. 27 is a side view of an outrigger positioning and stabilizing post mounted on a transverse spacer tube as seen in FIGS. 3 and 5 to swing between folded or inoperative and extended or operative positions of the carrier parts along with the outrigger braces.

The smaller diameter tube 55 of each outrigger brace may be adjusted longitudinally in the larger diameter tube 55a between extended position, FIG. 2, and telescoped or retracted position, FIG. 25, where it is held by a suitable manually releasable locking device, as a spring latch 66. A stop rod 67 mounted coaxially in fixed longitudinal position in tube 55a is secured therein by a cross pin 68 near its upper end. Said rod is provided near its lower end with a stop and spacing pin 69 whereof the length is slightly less than the inside diameter of tube 55. Said pin 69 operates to retain the lower end of rod 67 centrally in tube 55 and to limit the extent of outward endwise movement of said tube 55 in relation to tube 55a. Where said stop rod 67 is of flat stock, or rectangular in cross section, an end or stop wall 70 thereof is provided with a rod engaging and guiding slot 71, FIG. 26, which allows tube 55 to slide in tube 55a approximately the length of said rod 67, or until the inner face of end wall 70 is intercepted by said stop pin 69.

This prevents accidental separation of tube 55 from tube 55a after the parts have been assembled.

Final adjustment of the effective length of the outrigger braces may be made by adjusting means including longitudinally movable legs each having a foot 72. The shank portion of each such leg is threaded, as at 73, FIG. 25, and extends into the open lower end of tube 55 through a suitable adjusting collar and nut 74 rotatably mounted at the end of said tube 55 and operatively engaging said threaded shank 73. Where the circumstances require adjustment of an outrigger brace to less than its maximum length, tube 55 may be extended in tube 55a only a part of its available length, or such that said end, or stop wall 70 does not engage stop pin 69 on stop rod 67. Said clamp 59 may also function to secure tube 55 in any desired operative position in tube 55a by tightening its retaining nut on a bolt 75, FIG. 5, said bolt also providing a pivot to which the outer end of tying member 61 is connected.

Figure 24:
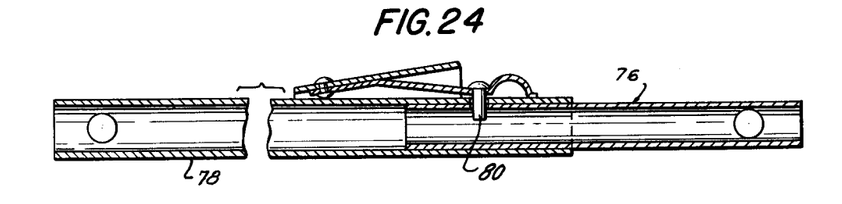
FIG. 24, a view in longitudinal section on enlarged scale showing a latch for releasably holding the brace shown in FIG. 23 in extended condition.

The outrigger assembly, as seen in FIG. 3, is further stabilized in operative condition by a brace interposed between post 57 and cross piece 22 of front end frame 10. Said brace includes a tube 78 and a tube 76 of smaller diameter (right FIG. 24) which telescopes with tube 78. Tube 76 is connected to a bracket 77 (FIG. 27) on post 57 by means of a suitable pivot pin, FIG. 5. Tube 78 is pivoted to a bracket 79 on cross piece 22 of front end frame 10 which also provides a rest for an end portion of said post 57 when in folded position. A spring biased pin 80, FIG. 24, interlocks said tubes 78 and 76 when in extended condition and may be lifted manually to permit folding of the parts as hereinafter described.

As seen in FIG. 27, the hollow post 57 which is secured at one end to the cross piece 48, as previously noted, is telescoped with an outer end or extension tube 81 having at its outer end a hook 82. A spring pressed latch 83 releasably retains hook 82 in engagement with a portion of bracket 79 on cross piece 22, FIG. 6, when the interconnected parts are in folded condition, FIG. 5; and the carrier is releasably secured in said folded condition by a frame connector or latch, as 130, FIG. 2, mounted to swing on a cross piece 131 of rear frame 11. When carrier A is folded, the hook end of said latch is releasably engaged with a correspondingly positioned cross piece 131a of front frame 10.

Figure 23:
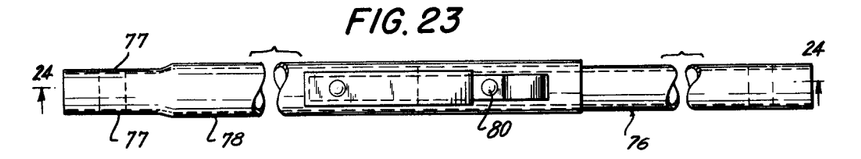
FIG. 23, a plan view of an adjustable brace interposed longitudinally between an end frame and a portion of the outrigger brace assembly.

With the carrier parts arranged in the operative or extended condition shown in FIG. 2, spacer tube 48 is interlocked with opposed frame braces 19; post 57 is in depending position; and the tie links 61 cooperating with post 57 are positioned to hold the outrigger brace tubes in extended position and thus afford means to resist buckling of the braces under adverse load conditions. To fold the carrier A from said extended condition, as seen in FIG. 2 into inoperative or collapsed condition, FIG. 5, detent 80 is lifted to disengage brace 76, 78 FIG. 23; clamp 63 is released; outrigger brace tubes 55 are telescoped into brace tubes 55a and the post 57, the links 61 and the brace 76, 78 of the outrigger brace assembly are brought into substantially parallel relation as clamp 63 slides upward, FIG. 2, along post 57 toward cross tube 48. Said cross tube 48 is released from interlock with tubes 19 by pressing the finger holds or pins 53 toward each other. Said depending parts may then be swung as a unit with rotation of cross tube 48 on bearings 47 (clockwise FIG. 2) into up position where they can be releasably secured to bracket 79 by suitable locking means including, for example, said hook 82 and said spring latch 83, FIG. 6, at the outer end of post 57, when the end frames are moved into their collapsed or folded positions. Said hook 82 is of such size and shape as to engage and embrace a tubular portion of said bracket 79 which is secured at its opposite side to the top cross piece 22 of front end frame 10 in such manner as to provide a recess, FIG. 6, disposed between said bracket 79 and said cross piece 22 and adapted to receive the outer end of said spring latch 83 which may be manually retracted against pressure of the biasing spring in a direction to dislodge its outer end from said recess and thus to release hook 82 from engagement with said tubular bracket 79. This with release of other locking devices permits extension of the folded and nested parts and their return toward the condition for use shown in FIG. 2.

The above described mobile carrier A, FIG. 1, in one contemplated manner of use serves primarily as a support for the adjustable ladder 13, 14, said platform B at the upper end thereof and the adjustable bracing means 16, 17 for effectively bracing the ladder and platform in various positions or at different elevations above the floor or other base.

Figures 14, 15:
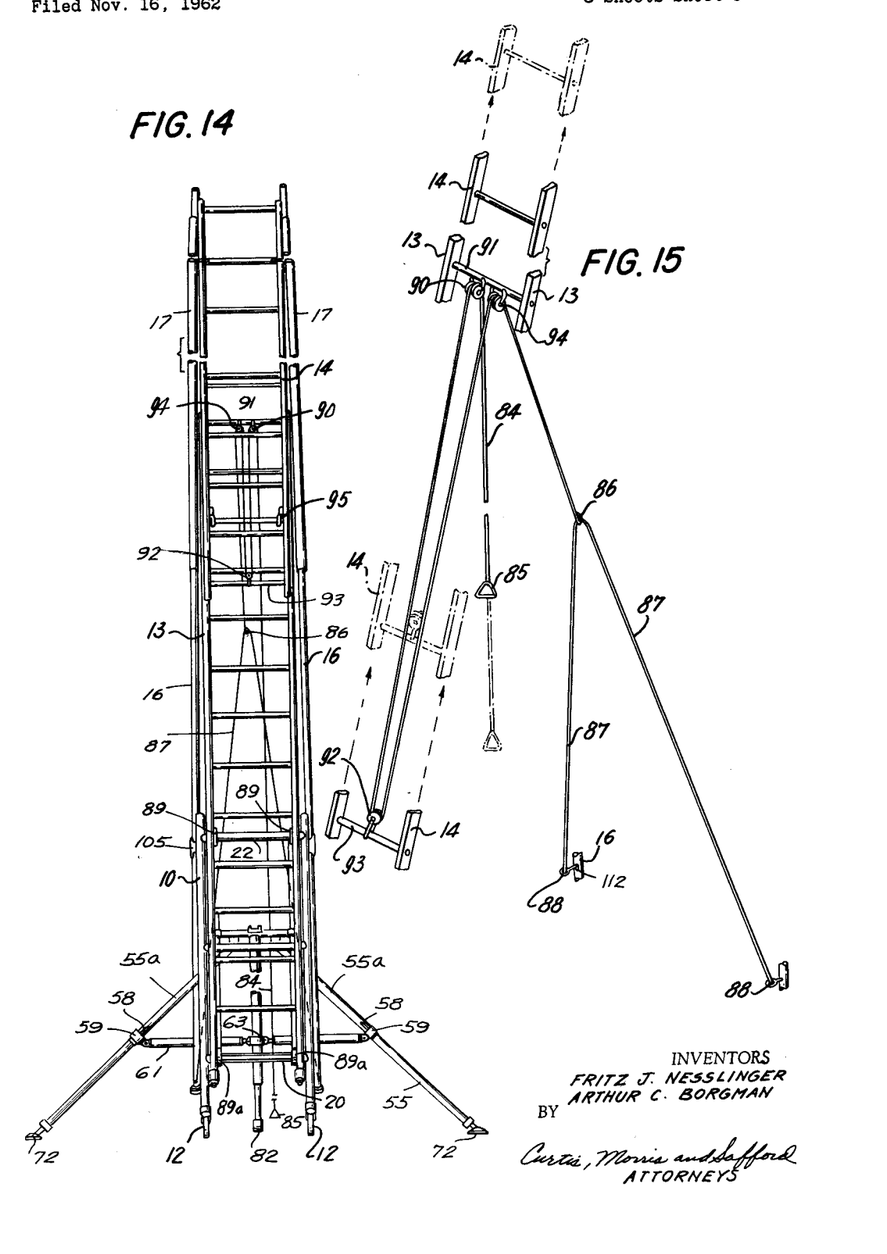
FIG. 14, a front elevation of portions of the ladder assembly in place on a carrier and showing the upper ladder in extended position and the ladder raising and lowering harness operatively connected therewith and with the main or lower ladder.
FIG. 15, a view, partly diagrammatic, showing the ladder and brace raising and lowering harness including a line or rope with spaced ends each connected to parts associated with a lower brace tube and with intermediate portions engaging pulleys at the upper end of the main ladder and a pulley at the lower end of the extendable ladder, the apparatus and harness parts as shown in full lines being in approximately their relative positions when the extendable ladder is in down or retracted position and, as shown in dotted lines, in the positions thereof when said ladder is in an extended condition.

As indicated in FIGS. 2 and 14, the side rails of the main ladder 13 are fitted with fixed hooks of conventional type, one pair (upper) 89 being positioned to engage and rest on an upper cross piece 22 and the lower pair, as 89a, FIG. 2, to engage and rest on a lower cross piece 20 of the front end frame 10 of carrier A. Said main ladder 13 when mounted for use is inclined at an angle which is approximately that of the plane of the front end frame 10. In a typical embodiment the arrangement is such that the axis of work platform B, when mounted on extendable ladder 14, FIG. 1, will be in a substantially vertical plane; and said platform and the center of gravity of a load thereon will be positioned vertically above the base area defined by the end frames 10 and 11 and the ends of said outriggers and substantially coaxially therewith at the maximum elevation of said platform above the floor.

As seen in FIGS. 14 and 15, the raising and lowering of the extendable ladder 14 along with platform B thereon in relation to the main ladder 13 and the simultaneous corresponding movement of the ladder brace tubes 17 in relation to tubes 16 are conveniently effected by manual operation of a suitable harness of rope, or the like, including a line 84 provided at one end with a hand hold 85, its opposite end being secured at 86 to a line 87 having its end portions operatively connected to rings 88 of lock controlling devices associated with lower end portions of the lower tubes 16 of said ladder braces. Between said hand hold 85 and the connection at 86 with second line 87, line 84, as seen in FIG. 15, passes upwardly and over a pulley 90 secured advantageously to an upper rung 91 of the main ladder 13, thence downwardly and around a pulley 92 secured to a lower rung 93 of the extendable ladder 14, thence upwardly and over a second pulley 94 also secured to an upper rung as 91 of the main ladder 13 and thence downwardly to said ring connections at 88. Ladder 14 is conveniently equipped with suitable, as conventional, pivoted hooks 95 which readily engage and disengage rungs of the main ladder 13 in a known manner. Thus, when an operator pulls down on handle 85 with ladder 14 in down position, dotted, FIG. 1, full line FIG. 15, the resulting endwise movement of line 84 is transmitted through pulleys 90, 92 and 94, and thence to line 87 and rings 88, FIG. 15, in that order, initially to release the ladder brace locks and then to lift extendable ladder 14 to dotted line positions, FIG. 15. This brings the pivoted hooks 95 thereon opposite any desired rung of main ladder 13 where, by slacking on line 84, said hooks are permitted to swing to operatively engage the selected rung, or rungs in a known manner; and the brace locks are restored to locking condition.

The extendable ladder 14 is advantageously braced against undue lateral swing by the extendable lateral braces each comprising the previously described set of telescoping tubes 16, 17, FIGS. 1 and 14 assembled therewith. As seen in said figures, when said braces are assembled for use, the bottom ends of the two smaller diameter or lower tubes 16 thereof rest on and are secured to brackets 96 provided on the rear frame 11 of carrier A, FIG. 2. Each of said brackets includes a pintle 97 which extends upwardly into the open lower end of tube 16; and a suitable releasable latching device 98, FIG. 12 secured at the end of tube 16 cooperates with said bracket 96 to prevent upward displacement of the tubes 16 from operative position thereon more particularly when the ladder 14 and upper brace tubes 17 are being moved to extended condition.

Figures 9, 10, 17:
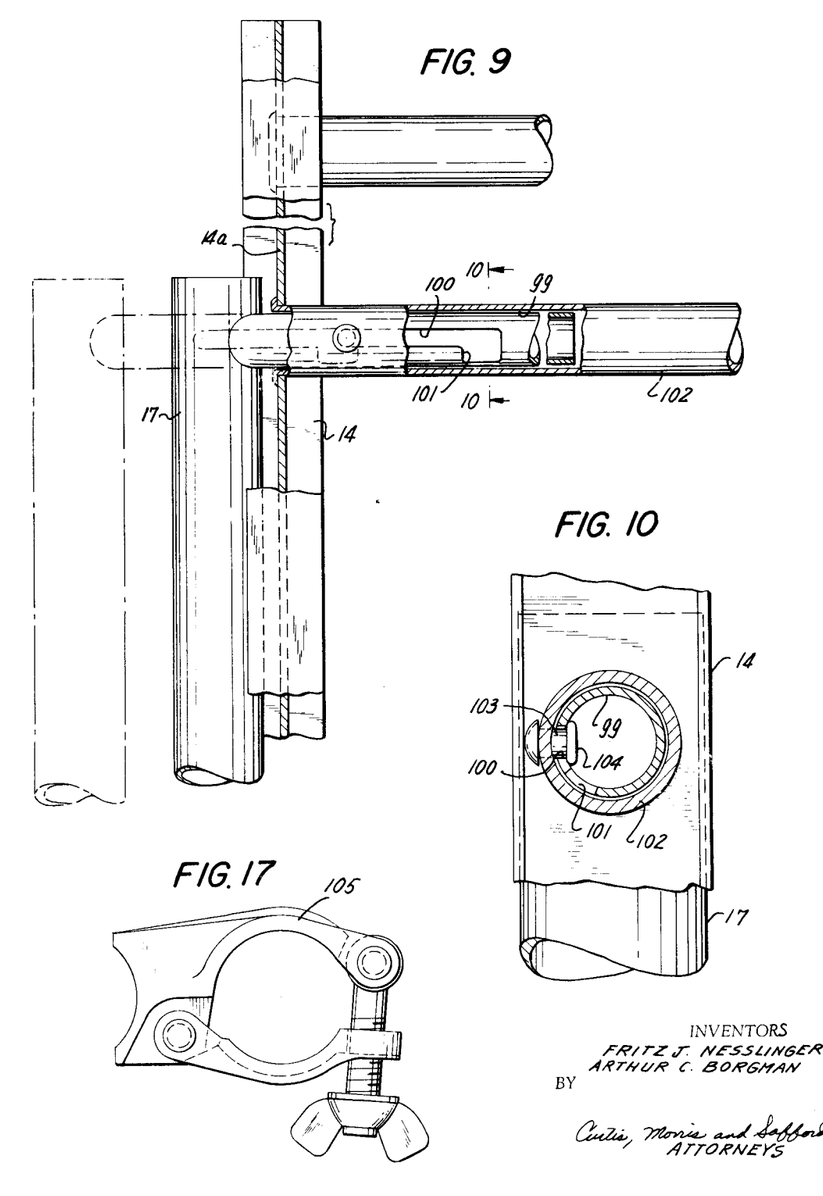
FIG. 9, a fragmentary view on enlarged scale partly in transverse vertical section and with parts cut away showing the pivotal connection between an upper end portion of one of the two upper ladder brace tubes and an upper end portion of the extendable ladder, indicated in full lines as the parts are related when the ladder assembly is in inoperative condition and in dotted lines as the parts are related when said upper ladder and said braces are in extended or operative position or in condition to be moved to and from said position.
FIG. 10, an enlarged fragmentary view in vertical section on the line 10—10 of FIG. 9.
FIG. 17, shows a clamp lock one of which is secured to an upper end portion of each upright member of the rear frame in position to releasably engage intermediate portions of the ladder braces to steady the same when in extended condition.

Said tubes 17 which are movable with up and down adjustment of ladder 14 are pivotally connected at their upper ends to upper end portions of said ladder 14 and are laterally adjustable in relation thereto. Thus, as seen in FIGS. 9 and 10, the upper end portion of each tube 17 is fitted with a laterally extending tubular arm 99 provided with an L-shaped slot 100 having a transversely disposed widened end portion at 101. The tubular rung 102 of ladder 14, which may advantageously be the second from the top, opens at its ends through the rails of ladder 14, the bore of said rung 102 being of a diameter to provide an easy sliding and rotating fit with exterior surface portions of said arm 99, as seen in FIGS. 9 and 10. A rivet nut or stud secured in the wall of rung 102 includes a shank 103, FIG. 10, and a flanged end or head 104. When tube 17 is adjusted laterally in relation to its adjacent rail of ladder 14, shank 103 rides in said slot 100 between end positions defined by the end edges of said slot. When said tubes 17 are in their outward lateral end positions in relation to their respective rails, as shown in broken lines, FIG. 9, as for use, FIG. 14, the ladder braces which include said tubes occupy positions laterally spaced outwardly from and clear of the rails of ladder 14 to the extent permitted by the length of slot 100 being sufficient to permit the braces to swing past the ladder rails. This brings the transversely disposed end portion 101 of slot 100 opposite and in position to embrace shank 103 of the rivet nut. When the free end of said brace is swung to rotate arm 99 on its axis, as occurs when, in assembling the apparatus, the brace ends are moved rearwardly in an arc away from ladder 14, i.e. from dotted full line position, FIG. 1, the bottom ends of tubes 16 are engaged with said brackets 96. In this position of the brace tubes 16, 17 in relation to rung 102 and ladder 14, the upper ends of said braces are capable of angular movement to an extent limited by the peripheral extent of said transverse or widened end portion 101 of slot 100, i.e. between their down position, shown dotted, and their maximum up, or extended position shown in full lines in FIG. 1. When in this up position, a midportion of each ladder brace tube 16 is advantageously releasably engaged in a clamp lock 105 of conventional type, FIG. 17, being part of a fitting or bracket secured to upper end portions of rear frame 11, FIG. 2.

Figures 11, 12:
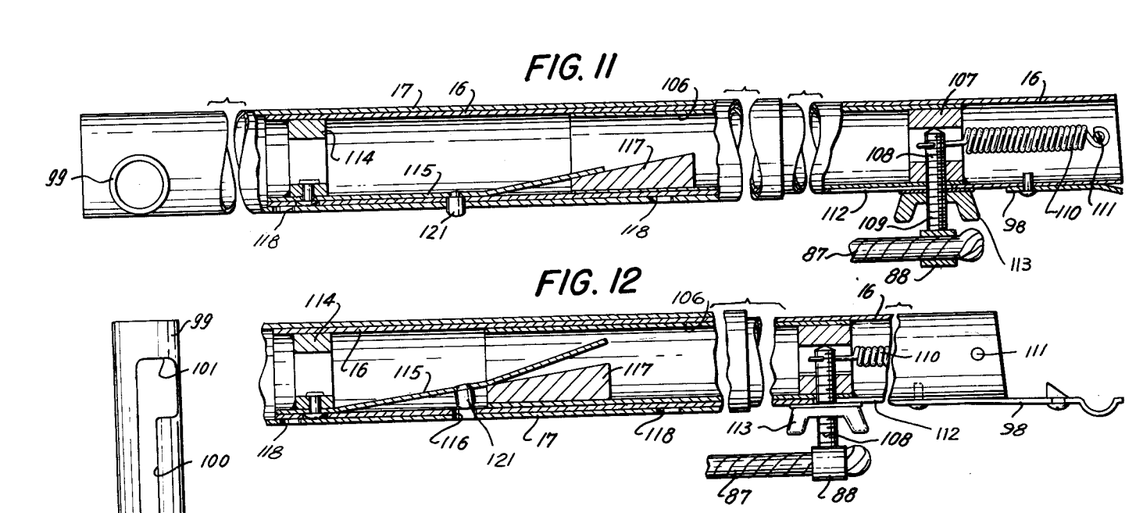
FIG. 11, a fragmentary view partly in longitudinal section of opposite end portions of a ladder brace which is shown to include an upper brace tube of relatively larger diameter telescoping with a lower brace tube of smaller diameter and fitted with devices for releasably locking said tubes in various positions of longitudinal adjustment of the upper tube in relation to the lower tube, the parts being shown in a locked condition as when the ladder and the upper tube are not being moved to or from extended condition.
FIG. 12, a fragmentary view in longitudinal section of a portion of the locking means shown in FIG. 11 but with the locking parts in released position to permit relative movement between the tubes when the extendable ladder is raised or lowered and showing a spring latch at the lower end of the lower tube for releasably retaining said tube end in operative position on the rear frame of a carrier.
Figure 13:
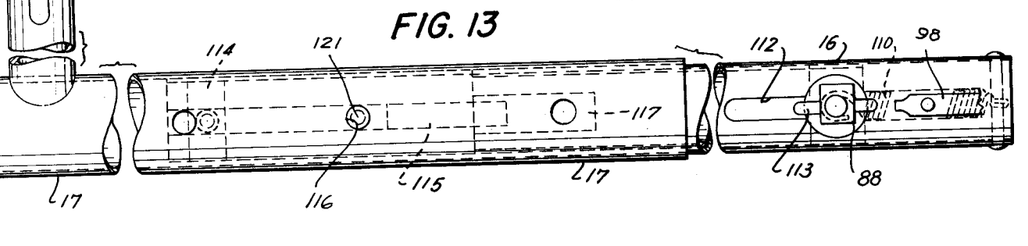
FIG. 13, a fragmentary view of the ladder brace with parts of the locking devices, shown in dotted lines, in locking relation to portions of the component telescoping upper and lower tubes as illustrated in FIG. 11.

As seen in FIGS. 11, 12 and 13, said lateral ladder braces are provided with locking devices whereby the telescoping parts or tubes 16, 17 may be readily and effectively interlocked at different extended positions of ladder 14 along with raising and lowering of said ladder 14, and releasably retained in the corresponding predetermined positions of relative longitudinal adjustment to accommodate various use conditions. Such a locking device for said braces may advantageously include a locking rod 106 conveniently in the form of a tube mounted with a freely sliding fit coaxially in the lower tube 16 of each lateral ladder brace set. At its lower end, right FIG. 11, said locking rod 106 has a fixed ring 107 which receives the threaded shank 108 of an arm 109 conveniently in the form of an eyebolt providing at its outer end the ring 88 for connecting line 87 with said locking device and for anchoring the ends of said line 87 to raise ladder 14. The inner end of arm 109 also provides an anchor for one end of a tension spring 110, the other end of which is engaged with a pin 111 extending transversely across the bore of tube 16. The outer end of the shank of arm 109 extends radially through a longitudinal slot 112 in the wall of tube 16 so that locking rod 106 is capable of being moved longitudinally in relation to said brace tube 16 to an extent limited by the length of said slot 112. A wing nut 113 threaded on said arm 109 can be tightened to releasably clamp said rod 106 to tube 16 and thus to retain said inner tube in its lock releasing position, FIG. 12, against tension of spring 110 and so permit free endwise movement of tube 17 in relation to tube 16 when desired. When nut 113 is loosened, rod 106 is automatically moved by spring 110 toward the right, FIG. 11, to the locking position there indicated.

To effect said locking, lower tube 16 has suitable latch or detent devices which are conveniently retained in position by a ring 114 fixed interiorly at the upper or inner end (left FIG. 11) of tube 16. A flat spring 115 has one end secured between said ring 114 and an opposed portion of the wall of tube 16 which has a hole 116 positioned opposite spring 115 to receive a detent 121 mounted at an intermediate portion of said spring 115. Said hole 116 is also located beyond (left FIG. 12) the inner end of rod 106. A wedge cam 117 is secured inside the inner end of said rod 106 in a position to continuously engage an under side portion of the free or bent up end of spring 115, FIGS. 11 and 12, as said locking rod 106 is caused to slide longitudinally between the respective end positions indicated in said FIGS. 11 and 12.

The upper brace tube 17 in each brace set is provided with a plurality of holes 118 in a row substantially parallel to and aligned with said detent 121 and hole 116 in the wall of lower tube 16 as tube 17 is moved longitudinally in telescoping relation to said tube 16 during raising and lowering of the extendable ladder 14. Thus, when a hole 118 of tube 17 comes opposite hole 116 and detent 121 during adjusting movement of the tubes 17 while locking rod 106 and said detent 121 are in unlocked condition, as in FIG. 12, the holes 118 in said tube 17 will ride past said hole 116 and said detent to bring tube 17 to the desired end position. If, however, the locking rod 106 is in locking position, as in FIG. 11, said detent 121 will snap into locking engagement through hole 116 in tube 16 with the next hole 118 of tube 17 to come opposite said hole 116 as relative movement of tube 17 in relation to tube 16 progresses. It is noted that the spring latch 98 engaging bracket 96 holds tube 16 against upward displacement during the outward or upward movement of tube 17 here considered.

Normally spring 110 and associated parts of the locking devices tend to retain said brace tubes 16, 17 in interlocked relation, FIG. 11, which is their condition prior to raising ladder 14 or when disposed as shown in dotted lines, FIG. 1. However, when an operator pulls down on hand hold 85 tension is transmitted initially through line 84 and through lines 87, to lift the arms 109 in slots 112 against resistance of their springs 110. During this movement of arms 109 to the upper or stop ends of said slots, lower tubes 16 are secured against upward displacement from brackets 96 as above noted. When said arms 109 reach the upper ends of slots 112 locking rods 106 reach the unlocking or detent lifting position as seen in FIG. 12; and upper tube 17, thus released from interlock with lower tube 16, may now be moved upwardly along with raising or extending movement of ladder 14 effected by continued downward pull on hand hold 85 and thence on line 84.

When ladder 14 reaches its uppermost, or any desired intermediate position of extension, the operator slacks off on line 84. This not only permits hooks 95 on ladder 14 to engage adjacent rungs on ladder 13 as previously noted but also allows spring 110 to retract locking rod 106 to its normal locking position, as seen in FIG. 11, whereby the detent 121 is spring pressed through holes 116 and 118; and brace tubes 16, 17 are thereby interlocked in a desired position.

To lower ladder 14 and upper brace tube 17 from extended position, the operator pulls down on hand hold 85 sufficiently to lift hooks 95 from supporting engagement with ladder 13 and to raise arm 109 to the upper end (left, FIGS. 11, 13) of slot 112, thereby to lift detent 121 and release the interlock between tubes 16 and 17. The wing nut 113 may be tightened to clamp the locking devices in unlocked condition, FIG. 12, so that with slacking on line 84, the ladder 14 and tube 17 may move freely by gravity to their lowermost or to a desired lower intermediate position or positions.

Under typical conditions, the above described apparatus will advantageously be stored and transported to and from its place of use with the carrier A in the collapsed or folded condition as seen in FIG. 5. Also the lateral ladder brace sets 16, 17 will remain engaged with the side rails of ladder 14 and with their tubular arms 99 telescoping in rung 102 as shown in full lines, FIG. 9; and ladder 14 may conveniently be lashed to ladder 13 by means of portions of line 84. In this arrangement, the ladder braces lie parallel and in effect nest with the respective ladder side rails thus contributing to compactness and ease in handling when the equipment is not assembled for use.

It will be understood that relatively light weight metals such as aluminum or alloys thereof will be preferred throughout the apparatus wherever they can be employed without sacrificing strength or durability.

Assuming that a preferred embodiment of the invention as above described is at a use location in disassembled condition and is to be assembled for use, in a typical case the operator releases the frame connector 130 which holds the carrier A in folded or inoperative condition and unfolds or extends carrier A to the condition shown in FIG. 2. After carrier A is extended, the spring latch 83 may be manually released to lift hook 82 and push back tube 81 into tube 57, thereby permitting the operator to swing leg 57, from its FIG. 5 position to the depending position seen in FIG. 2. With said locking devices released, the end frames 10 and 11 may now be readily drawn apart; the frame braces extended and locked in extended condition and the outrigger braces extended, adjusted to, and locked in effective supporting or bracing positions. Clamp 63 which with post 57 holds said outrigger braces in operative extended relation may also be employed to supplement the locking effect of the other locking devices for maintaining the parts in the folded condition shown in FIG. 5 and, in such case, will be loosened to permit adjustment of the connected parts.

Figure 6:
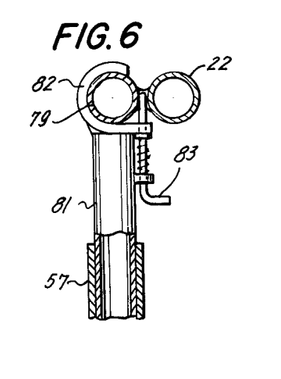
FIG. 6, a fragmentary view partly in longitudinal vertical section on line 6—6 of FIG. 5, showing free or outer end portions of the post and locking devices carried thereby, said parts being positioned as when the carrier is in folded condition.

It will appear from the foregoing description that, after the locking devices are released from position to lock leg 57 in folded condition, FIG. 5, and said leg is turned 180° counterclockwise as seen in FIG. 6, said spring biased locking tubes 51 and pins 52 will again engage bearings 47 and thereby in effect interlock the carrier brace parts 19a with cross piece 48 and the outrigger assembly.

The operator may now mount main ladder part 13 on the front frame 10, along with the extendable ladder 14 and ladder braces 16, 17 as by engaging hooks 89 on ladder 13 with lower cross piece 20 and upper cross piece 22 of frame 10. The extendable ladder 14, engaged with main ladder 13, as by the pivoted hooks 95, is initially in its lower or retracted condition (indicated in dotted lines, FIG. 1). At this stage, the platform assembly B may conveniently be mounted at the top end of ladder 14 which is provided with laterally disposed tubes 119 providing sockets arranged to receive and releasably retain the end portions of legs 120 which, with other frame parts, as 15, form said work platform B.

To steady the extended ladder and platform, the upper ends of ladder braces are pulled outwardly (laterally) to come clear of the ladder rails and the free or lower ends of said braces are now swung rearwardly into operative position. The bottom ends of said lower brace tubes 16 are engaged with the pintles 97 provided by brackets 96 on rear frame 11 and the spring latches 98 are engaged with said brackets to secure said tubes 16 against lateral and upward displacement as above described. The parts are now in condition for raising ladder 14 and platform B, as previously described, and for simultaneously extending the lateral ladder brace tubes 17 by pulling downwardly on hand hold 85 to the extent necessary to bring work platform B to the desired height or level above the floor on which the apparatus is supported. By slacking on line 84, tubes 17 are permitted automatically to interlock with tubes 16 at the desired height or level.

Although we have shown and described a single embodiment of the invention constituting the subject matter of this application, it is contemplated that various changes may be made in structural features and arrangements of the parts of such embodiment without departing from the essential purpose or scope of the invention. Accordingly, without limitation in respect to any such details, our invention is defined in the appended claims:

We claim:

1. Scaffold apparatus comprising end frames, foldable bracing means operatively connecting said end frames and including two transversely spaced sets of braces, each such set comprising a pair of larger diameter tubes pivotally interconnected between their ends and each pivotally connected at an end portion to one of said end frames and a pair of smaller diameter tubes each assembled with one end portion telescoping into an open end of one of said larger diameter tubes and having its other end pivotally connected to a portion of one of said end frames, a transverse spacer tube operatively positioned between said two sets of braces and rotatably supported at its ends on the opposed larger diameter tubes of said sets and coaxially with the pivotal interconnection between them, whereby relative angular movement between the larger tubes of each set may be effected simultaneously with relative angular movement between said opposed larger tubes and said spacer tube during folding and and unfolding operation of said bracing means.

2. Apparatus according to claim 1 and including transversely spaced sets of outrigger braces pivotally mounted on said transverse spacer tube and angularly adjustable to and from lateral bracing position.

3. Apparatus according to claim 2 and wherein each set of said outrigger braces includes a larger diameter outrigger tube pivotally connected at one end to said spacer tube and a smaller diameter outrigger tube assembled with one end telescoped in the free end of said larger diameter outrigger tube, and outrigger stabilizing means including a transversely disposed tie member operatively interposed between said sets of outrigger braces.

4. Apparatus according to claim 3 and wherein a post is arranged with an end portion rigidly secured to said spacer tube between the spaced ends of said larger diameter outrigger tubes, a clamp collar mounted to slide lengthwise on said post, said tie member including separate links each pivotally connected at its outer end to one of said outrigger braces and pivotally connected at its inner end to said collar.

5. Apparatus according to claim 4 and wherein said outrigger stabilizing means includes a longitudinally adjustable brace having one end pivotally connected to said post and its opposite end pivotally connected to one of said end frames.

6. Apparatus according to claim 3 and having a post secured at one end to said spacer tube, said tie member including two links each of which is pivotally connected at one end to one of said larger diameter outrigger tubes, and means slidably mounted on said post for pivotally connecting the other end of each of said links to said post.

7. Apparatus according to claim 1 and including locking devices operatively interposed between said spacer and said opposed larger tubes of said sets of braces and arranged and adapted when in locking condition to releasably lock said opposed larger brace tubes and said spacer together and, when in unlocked condition, to permit relative angular movement between said parts in transition between the folded and the extended conditions thereof.

8. Apparatus according to claim 7 and wherein said locking devices include locking plungers mounted coaxially in said spacer tube and being spring biased toward locking position therein and means accessible outside of said spacer tube and operatively connected to said plungers for manually moving the same out of said locking position.

9. Apparatus according to claim 8 and wherein said means for manually moving the locking plungers is arranged with outer end portions extending through a slot in said spacer tube thereby preventing relative rotative displacement between said plungers and said spacer tube.

10. A ladder carrier for scaffold apparatus comprising end frames, two transversely spaced sets of side braces supported on and connecting said end frames, each such set including two larger diameter tubular brace members pivotally interconnected between their ends for angular movement to and from crossed relation and each being pivotally connected at one end to an upper portion of an end frame, two smaller diameter tubular brace members each having one end portion telescoped in one of said larger diameter tubular brace members and being pivotally connected at its other end to a lower portion of an end frame, a transversely disposed spacer tube operatively arranged between said sets of side braces and mounted thereon to rotate coaxially with said pivot connections between said larger diameter tubular brace members thereof, and an outrigger brace assembly mounted on said spacer tube and angularly movable therewith between inoperative folded condition and operative extended condition of the carrier parts.

11. Adjustable ladder brace for extension scaffolds comprising a larger diameter first tube, a smaller diameter second tube in telescoping engagement with end portions thereof, said first mentioned tube having a plurality of aligned longitudinally spaced holes and said second mentioned tube having a longitudinal slot, a locking detent mounted on said second mentioned tube and normally positioned to engage one or another of said holes in the first mentioned tube at different longitudinal positions of the latter in relation to the former, detent actuating means including a rod longitudinally slidable in said second tube to an extent limited by said slot and having devices thereon for lifting said detent out of position to engage said holes in the upper tube, and devices including an arm operatively connected to said rod and extending radially through said slot into position to be moved longitudinally therein between its ends and arranged and adapted to move said rod longitudinally in said second tube in a direction to lift said detent out of locking position in relation to said holes in the first mentioned tube.

12. Apparatus according to claim 11 and wherein said rod is spring biased longitudinally in one direction and manually actuated devices operatively connected to said arm are arranged and adapted to displace said arm longitudinally in said slot and thereby said rod in said second tube in a direction against resistance of said biasing spring to move said detent out of position to engage said holes whereby relative endwise movement is permitted between said brace tubes while said arm and said rod are retained in said displaced condition.

13. Apparatus according to claim 11 and wherein said detent is mounted on a free end portion of a detent carrying spring and thereby biased toward hole engaging position, and said rod is provided with a cam which engages and lifts said free end portion of the spring and therewith said detent when said rod is advanced longitudinally in said second tube against resistance of said longitudinally biasing spring.

14. An extension scaffold including a ladder carrier having end frames each inclined toward the other, a main ladder arranged and adapted to be mounted on one of said frames and at substantially the same angle of inclination as that of said frame, an extendable ladder longitudinally slidable on said main ladder, tubular ladder braces each including cooperating telescoping parts, said braces being pivotally connected at their upper ends to upper end portions of the extendable ladder, the bottom ends of said braces being realeasably connected to and supported on the end frames, brace locking devices operatively interposed between said telescoping parts, and a ladder and brace actuating and controlling harness including a line having end portions secured to portions of said locking devices at the lower ends of said braces, and another portion of said line having a handhold at one end and connected at its other end with said first mentioned end portions, and intermediate portions of said line being operatively engaged with a pulley on the extendable ladder and with two pulleys on the main ladder whereby said extendable ladder and the ladder braces are movable upwardly in relation to said main ladder when downward pull is exerted on said handhold.

15. A carrier for extension scaffolds comprising end frames, carrier bracing means operatively connected to and interposed between said end frames and including two transversely spaced sets of brace members, each such set comprising a pair of interconnected larger diameter tubes each pivotally connected at one end to an upper end portion of one of said end frames and a pair of smaller diameter tubes each assembled with its upper end portion telescoping into lower end portions of one of said larger diameter tubes and each smaller diameter tube being pivotally connected to a lower portion of one of said end frames, a transverse spacer operatively positioned between said two sets of braces and rotatably supported on and between the opposed larger tubes of said two sets whereby relative angular movement between the larger diameter tubes of each pair thereof and between the opposed larger diameter tubes of said two sets of braces may be effected simultaneously during folding and unfolding operation of the carrier parts.

16. A ladder and brace assembly for extension scaffolds comprising an extendable ladder having a tubular rung arranged with its ends opening laterally through web portions of its side rails, and a ladder brace provided at one end with a laterally projecting tubular arm which extends into said tubular rung through an open end thereof, said arm having an L-shaped longitudinally arranged slot and said rung having a detent extending radially into said slot, said arm being slidable endwise in the rung to an extent limited by the movement of said slot in relation to said detent and being rotatable coaxially in said rung to an extent limited by the L-portion of said slot, whereby when said L-portion of the slot comes opposite said detent the free end of the brace is permitted to be moved in a limited arc relatively to the ladder but is retained against such movement at other relative positions of the arm and said detent.

17. Scaffold apparatus comprising a ladder carrier assembly which is collapsible to a folded inoperative condition and expandable to an extended operative condition, said assembly including end frames and transversely spaced sets of extendable and foldable braces operatively interposed between said end frames, each of said sets including two pivotally interconnected brace tubes and two other brace tubes each with one end arranged and adapted to telescope into an end of one of said interconnected brace tubes, each of the latter being pivotally connected at its other end to portions of one of said end frames and said other brace tubes each being pivotally connected at its other end to a portion of one of said end frames, and brace locking devices including parts mounted in each of said interconnected brace tubes and parts mounted in each of said other brace tubes and cooperating with said first mentioned brace tubes whereby, when said telescoping brace tubes are moved longitudinally into extended relation, parts of said locking devices in the one of said tubes are rotated by said parts in the other tube toward brace locking position, and manually operative means are provided for releasing said locking parts into unlocking position to permit endwise relative movement of said tubes from extended condition into retracted or telescoping condition.

18. Apparatus according to claim 17 and wherein the locking parts in each of the interconnected tubes include a locking rod mounted therein to rotate coaxially in said tube between locking and unlocking positions, and a spring biased toggle device arranged and adapted to releasably retain said rod both in its locking and in its unlocking angular positions.

19. Scaffold apparatus comprising a ladder carrier, a main ladder releasably mounted thereon, an extendable ladder mounted for endwise adjusting movement on said main ladder, ladder braces each including an upper brace tube pivotally connected at each side of an upper end part of said extendable ladder and a lower brace tube having its lower end releasably secured to said carrier and its upper end projecting into and slidable in the lower end of said upper brace tube, locking devices including parts in said lower brace tube arranged and adapted normally to interlock said upper and lower tubes, devices cooperating with said devices in said lower brace tube and with said extendable ladder including a line for transmitting an actuating pull initially to said locking parts in the lower brace tube to release said interlock between said upper and lower tubes and then to raise the extendable ladder and with it to move upper brace tube outwardly in relation to said lower brace tube.

20. Scaffold apparatus comprising longitudinally spaced end frames, laterally spaced pairs of side braces pivotally connecting said end frames, a spacer rotatably mounted on and operatively interposed between said pairs of side braces, a pair of tubular outrigger braces mounted in laterally spaced relation on said spacer, each of said outrigger braces including a tube of relatively larger diameter pivotally connected at one end to said spacer and a tube of smaller diameter telescoping into the other end of said larger tube, and means for limiting the extent of outward displacement of said smaller tube in relation to said larger tube comprising a rod mounted coaxially in said larger tube and having one end secured therein adjacent to the pivoted end thereof, a detent mounted transversely at the opposite end portion of said rod and said smaller tube having at one end a transversely arranged rod guiding slot and a transversely disposed stop arranged and adapted to be engaged by said detent when said smaller tube is moved to fully extended condition.

21. Apparatus according to claim 20 and wherein said transverse stop is provided by a wall extending across the tube bore and is perforated to provide said guide slot.

22. Apparatus according to claim 20 and wherein said larger tubes are connected by tying means pivotally connected to and operatively interposed between said larger tubes.

23. Apparatus according to claim 22 and including a post secured to said spacer, said tying means being also pivotally connected to said post.

24. A brace for extension scaffolds comprising an outer tube having opposed arcuate circumferentially extending slots and an inner tube telescoping with said outer tube, means for limiting relative extending movement between said tubes and for releasably locking the same against relative endwise movement when they are in extended condition, said means including a locking rod mounted coaxially and rotatably in the brace but held against longitudinal displacement therein, said rod having a transversely disposed locking bolt and a radially directed actuating lever arranged with an inner end portion extending through said rod and an outer end portion extending through and beyond one of said slots, torque imparting means carried by said inner tube and operatively engaging said bolt to impart angular movement thereto and thereby to rotate said rod on its longitudinal axis when force is applied to effect differential endwise movement between said tubes, and a toggle device including a spring biased arm having its inner end pivoted to said inner end portion of said lever and having its outer end extending through and beyond the other of said arcuate slots in the outer tube.

25. A brace for extension scaffolds comprising an outer tube having opposed arcuate circumferentially extending slots and an inner tube telescoping with said outer tube, means for limiting relative extending movement between said tubes and for releasably locking the same in extended conditions, said means including a locking rod provided with a transversely disposed locking bolt and arranged coaxially and rotatably in the brace but held against longitudinal displacement therein, a rod actuating lever extending from one side of said rod and through and outwardly beyond one of said arcuate slots, torque effecting means carried by said inner tube to impart angular movement to said bolt and thereby to rotate said locking rod on its longitudinal axis when force is applied to effect differential endwise movement between said tubes, and a toggle device including a spring biased arm pivotally connected at its inner end with and extending radially from the other side of said rod and having its outer end extending through and outwardly beyond the other of said arcuate slots in the outer tube.

26. A brace for extension scaffolds comprising a smaller diameter tube telescoped in a larger diameter tube, locking means arranged within said tubes and movable therein automatically with telescoping movement of the tubes to a position to releasably retain the smaller diameter tube in extended relation to the larger diameter tube, said locking means including a locking rod coaxially mounted in said larger diameter tube, rotatable therein and in fixed longitudinal relation thereto, a rod rotating block mounted in an end portion of said smaller diameter tube and having an axial bore adapted to receive a portion of said rod and a spiral groove opening along its length into said bore and having an opening at one end into said smaller diameter tube and an angularly offset recess at its other end, said rod having a locking bolt positioned to extend radially into and ride along said spiral groove to rotate said rod when said block is moved by telescoping relative movement between said tubes and to extend into said recess in the block at the end of said telescoping movement, and a rod actuating lever having an inner end portion secured to said rod and an outer end portion extending through and outwardly beyod an arcuate slot in said larger diameter tube, and a toggle device cooperating with said rod to releasably retain the same and said locking bolt in end positions determined by engagement of said lever with end walls of said slot.

27. Brace for extension scaffolds according to claim 26 and wherein said toggle device includes a toggle arm pivoted at its inner end to an inner end portion of the rod actuating lever and arranged with its outer end extending through and movable endwise and angularly in an opening in the larger diameter tube, and an arm biasing spring operatively positioned between said inner end portion of the actuating lever and adjacent wall portions of said larger diameter tube whereby said lever and the locking rod are yieldingly retained in said end positions.

References Cited in the file of this patent

UNITED STATES PATENTS

| 210,235 | Birch | Nov. 26, 1878 |
| 2,136,569 | Trimpi | Nov. 15, 1938 |
| 3,071,204 | Piltingsrud | Jan. 1, 1963 |

FOREIGN PATENTS

| 900,664 | France | Oct. 16, 1944 |